Patented June 5, 1945

2,377,568

UNITED STATES PATENT OFFICE 2,377,568

ETHERS OF CYCLIC KETALS

Kenneth E. Marple, Oakland, Calif., assignor to Shell Development Company, San Francisco, Calif., a corporation of Delaware No Drawing. Application March 3, 1941,
Serial No. 381,543

4 Claims. (Cl. 260—338)

This invention relates to novel ethers of cyclic ketals and to an improved method for manufacture of the same. More particularly, the invention is concerned with ethers of cyclic ketals obtained by reacting a mono ether of a trihydric alcohol with a ketone containing at least 8 carbon atoms.

It is an object of the present invention to provide a novel and useful class of ethers of cyclic ketals. A further object of the invention is to provide an improved process which enables the novel compounds to be prepared in good yields. These and other objects will be apparent from the description of the invention given hereinafter.

According to the process of the invention, the ethers of cyclic ketals are synthesized by reacting a mono ether of a trihydric alcohol with a ketone containing 8 or more carbon atoms in the presence of an inorganic acid-acting catalyst while removing the water of reaction from the reaction mixture, substantially as fast as formed. In separating the water from the reaction mixture, it is preferred that this be done by azeotropic distillation with an added agent during the course of the reaction. It has been discovered that by employing an inert organic azeotrope-forming substance in the reaction mixture, the reaction mixture may be heated and boiled to vaporize the azeotrope containing water of reaction and the desired ether of a cyclic ketal is obtained as the product in good yield. The agents employed to azeotropically distill the water from the reaction mixture include such substances like lower aromatic hydrocarbons such as benzene, toluene, the xylenes, etc.; lower aliphatic hydrocarbons such as hexane, heptane, octane, iso-octane, cyclohexane, etc.; halogenated hydrocarbons such as ethylene dichloride, propylene dichloride, ethylene dibromide, chloroform, phenyl chloride, etc., as well as substances such as dichloro diethyl ether, gasoline, and the like. In general, the agent is an inert organic compound substantially insoluble in water which has a normal boiling temperature between about 50° C. and 200° C.

In order that the desired reaction may progress at a practicable rate, it is necessary that the reaction be conducted in the presence of a catalyst such as an inorganic acid-acting catalyst. For this purpose, there may be used inorganic acids such as hydrochloric acid, sulfuric acid, phosphoric acid or other mineral acids as well as inorganic acid-acting salts such as ammonium chloride, sodium bisulfate, zinc chloride, ferric chloride and the like.

The ethers of cyclic ketals with which the invention is concerned are particularly useful compounds for many purposes and possess superior properties to those known heretofore. They are high boiling compounds which have very low volatility at ordinary temperatures. This property coupled with their chemical structure make them highly suitable for use as solvents, plasticizers, and the like.

The compounds of the invention are substituted 1,3-dioxolanes. These ethers of cyclic ketals contain a hydrocarbon residue which is a part of the dioxolane ring and to the hydrocarbon residue there is linked by means of the ethereal oxygen atom, a hydrocarbon radical. Furthermore, the 2-position of the 1,3-dioxolane ring contains two linkages to hydrocarbon substituents, the nature of which is determined by the particular ketone used in synthesizing the ether of the cyclic ketal. The presence in the molecule of these essential groups, namely, the hydrocarboxy group (the group containing the ethereal oxygen atom and the monovalent hydrocarbon radical linked thereto), the 1,3-dioxolane ring and the hydrocarbon radicals linked to the dioxolane ring, are responsible for the valuable properties of the novel compounds.

The ethers of cyclic ketals may be prepared from any suitable mono ethers of a trihydric alcohol. A large variety of mono ethers of trihydric alcohols fall within the classification. For example, there may be used such compounds as glyceryl alpha methyl ether, glyceryl alpha ethyl ether, glyceryl alpha isopropyl ether, glyceryl alpha cyclopentyl ether, glyceryl alpha cyclohexyl ether, glyceryl alpha phenyl ether, glyceryl alpha tolyl ether, glyceryl alpha naphthyl ether, glyceryl beta ethyl ether, glyceryl beta secondary amyl ether, glyceryl beta cetyl ether, glyceryl beta cyclohexyl ether, glyceryl beta phenyl ether, alpha methyl glyceryl alpha methyl ether, beta isopropyl glyceryl alpha isoheptyl ether, alpha phenyl glyceryl gamma cyclohexyl ether, 1-ethoxy-3,5-dihydroxy pentane, 2-phenoxy-1, 6-dihydroxy hexane, 1-isopropoxy-2,2-dimethylol butane, and the like.

The mono ether of a trihydric alcohol is reacted with a ketone containing 8 or more carbon atoms to yield the ethers of a cyclic ketal of the invention. A variety of ketones may be used for this purpose, but it is essential that they contain at least 8 carbon atoms so that the products will possess the desired low volatility. Among suitable ketones are included straight chain, branched chain, alicyclic and aromatic ketones such as methyl hexyl ketone, ethyl heptyl ketone, isopropyl secondary butyl ketone, methyl isohexyl ketone, ditertiary butyl ketone, methyl cyclohexyl ketone, acetophenone, propiophenone, carone, fenchone, fenchosantanone, and the like. Other ketones containing 8 or more carbon atoms which may be used and which are of more complex structure may be obtained by ketonization of higher fatty acids, (see U. S. Patent 1,058,225; 1,941,640 and 2,108,156) by condensation of ketone or ketones and aldehydes to form higher unsaturated ketones which may be saturated with hydrogen to yield higher complex aliphatic ketones (see U. S. Patents, 2,088,018; 2,198,375 and 2,309,650) and by hydrogenation of appropriate higher alkylated phenols followed by dehydrogenation of the carbinol group of the formed cyclic alcohol to yield higher cyclic ketones (see U. S. Patent 2,163,284). Particularly suitable ketones are obtained by condensing mesityl oxide and hydrogenating the olefinic bonds of the condensation products to give higher ketones of complex character (see U. S. Patent 2,309,650).

The novel compounds of the invention include the reaction products of any of the above-mentioned ethers of a trihydric alcohol with any of the above-mentioned ketones. More generally, the products are ethers of cyclic ketals from an ether of a trihydric alcohol and a ketone. The structure of many of the products is not definitely known, primarily because the structure of the ketones from which they are derived is also unknown. In the case of the simpler products, the structure may be readily given. Thus, for example, from glyceryl alpha phenyl ether and methyl hexyl ketone there is obtained the novel and useful compound, the phenyl ether of 4-methylol-2-methyl-2-hexyl-1,3-dioxolane.

The process of the invention may be executed in a variety of manners. A preferred method is to heat the reactants and other ingredients, namely, the ether of a trihydric alcohol, the ketone, the inorganic acid-acting catalyst and the inert organic azeotrope-forming agent, in a vessel equipped with a fractionating column to which is attached a separatory stillhead. The reaction mixture is boiled and the azeotrope-forming agent along with the water of reaction distilled from the reaction mixture, this water being removed substantially as fast as formed. The azeotrope is condensed and separated into two layers in the stillhead. The water layer thereof may be discarded while, if desired, the other layer may be returned to the fractionating column as reflux. The reactants and product are too high boiling to distill from the mixture to any appreciable extent in this operation. Upon completion of the reaction which is evidenced by failure of further water to appear in the distillate, the catalyst in the reaction mixture may be neutralized with a suitable base and the product and unreacted reactants recovered from the mixture, preferably, by distillation under subatmospheric pressure. Unreacted reactants recovered in the distillation may be utilized again in further reactions.

For the purpose of further illustrating the invention, the following examples are given, but it is to be understood that the invention is not limited to the various procedural details given nor the novel compounds disclosed therein.

*Example I*

An ether of a cyclic ketal of glycerol was prepared using as the ketone one which was obtained by hydrating a cut of cracked wax to form a secondary alcohol followed by dehydrogenation of the alcohol to the ketone. The ketone contained 8 carbon atoms. About 2 mols of glyceryl alpha monophenyl ether, 2.2 mols of the $C_8$ ketone, 5 cc. of concentrated hydrochloric acid and 100 cc. of benzene, were heated in a still fitted with a separatory still head. After refluxing for about 3¼ hours, a total of 38 cc. of water had been removed. The water came overhead with benzene and the vapors were condensed in the stillhead whereupon two layers formed. The aqueous layer was discarded while the benzene layer was returned to the still as reflux. Upon completion of the reaction, the acid was neutralized and the product was then distilled under reduced pressure. In this manner it was found that about 76.3 per cent of the ether was converted to the cyclic ketal, 14.1 per cent was recovered unchanged, 2.5 per cent remained as bottoms and 7.1 per cent was lost. The properties and analysis of the product, a colorless, somewhat viscous liquid, follow:

Boiling points, °C _____ 122–125 at 2 mm.
Specific gravity, 20/4 _____ 1.009
Refractive index, 20/D (Abbé) _____ 1.493
Carbon, per cent _____ 73.3
    Theoretical _____ 73.2
Hydrogen, per cent _____ 9.4
    Theoretical _____ 9.4

*Example II*

An ether of a cyclic ketal was prepared from a cyclic ketone containing 9 carbon atoms. This ketone was obtained by hydrogenating an alkylated phenol to obtain a cyclic alcohol and then dehydrogenating the alcohol to give the cyclic ketone. About 2 mols of the $C_9$ cyclic ketone, 2 mols of glyceryl alpha monoisopropyl ether, 5 cc. of concentrated hydrochloric acid and 100 cc. of benzene were refluxed together for approximately 4 hours during which time about 35 gms. of water were removed azeotropically with the benzene with the aid of a separatory stillhead. The acid was then neutralized and the mixture distilled under reduced pressure. In this run, about 68.0 per cent of the ketone was converted to the cyclic ketal and 32.0 per cent was recovered unchanged. Some properties of the product, a colorless liquid, are given below.

Boiling point °C _____ 110–114 at 1 mm.
Specific gravity, 20/4 _____ 0.9635
Refractive index, 20/D (Pulfrich) _____ 1.4523

I claim as my invention:

1. An ether of a cyclic ketal obtained by reacting glyceryl alpha mono-isopropyl ether and a cyclic ketone containing 9 carbon atoms.

2. An ether of a cyclic ketal obtained by reacting a secondary alkyl alpha mono ether of glycerol, said alkyl being unsubstituted and a cyclic ketone containing 9 carbon atoms.

3. An ether of a cyclic ketal obtained by reacting glyceryl alpha mono phenyl ether and a cyclic ketone containing 9 carbon atoms.

4. An ether of a cyclic ketal obtained by reacting a cyclic ketone containing 9 carbon atoms with a mono ether of glycerol wherein the hydrogen atom of one alpha hydroxyl group of the glycerol has been substituted by a monovalent unsubstituted secondary hydrocarbon radical.

KENNETH E. MARPLE.